US012755882B2

(12) United States Patent
Ieda et al.

(10) Patent No.: US 12,755,882 B2
(45) Date of Patent: Oct. 6, 2026

(54) THIN FILM INDUCTOR ELEMENT AND THIN FILM VARIABLE INDUCTOR ELEMENT

(71) Applicants: JAPAN ATOMIC ENERGY AGENCY, Ibaraki (JP); TOHOKU UNIVERSITY, Sendai (JP)

(72) Inventors: Jun'ichi Ieda, Ibaraki (JP); Yuta Yamane, Miyagi (JP); Shunsuke Fukami, Miyagi (JP)

(73) Assignees: JAPAN ATOMIC ENERGY AGENCY, Naka-gun (JP); TOHOKU UNIVERSITY, Sendai (JP)

( * ) Notice: Subject to any disclaimer, the term of this patent is extended or adjusted under 35 U.S.C. 154(b) by 529 days.

(21) Appl. No.: 18/546,002

(22) PCT Filed: Jan. 7, 2022

(86) PCT No.: PCT/JP2022/000296
§ 371 (c)(1),
(2) Date: Aug. 10, 2023

(87) PCT Pub. No.: WO2022/181069
PCT Pub. Date: Sep. 1, 2022

(65) Prior Publication Data

US 2024/0145147 A1 May 2, 2024

(30) Foreign Application Priority Data

Feb. 26, 2021 (JP) ................................ 2021-030176

(51) Int. Cl.
*H01F 10/32* (2006.01)
*H01F 17/02* (2006.01)
*H01F 21/00* (2006.01)

(52) U.S. Cl.
CPC ............ *H01F 10/32* (2013.01); *H01F 17/02* (2013.01); *H01F 21/005* (2013.01)

(58) Field of Classification Search
CPC ......... H01F 10/32; H01F 17/02; H01F 21/005
See application file for complete search history.

(56) References Cited

U.S. PATENT DOCUMENTS

2002/0047769 A1* 4/2002 Fedeli ................. H01F 10/3218 336/174
2010/0194510 A1* 8/2010 Pruegl .................. H01F 17/062 29/602.1

(Continued)

FOREIGN PATENT DOCUMENTS

JP 2002-158112 A 5/2002
KR 101598295 B1 2/2016

OTHER PUBLICATIONS

Japanese Patent Office Decision to Grant a Patent 2024 (Year: 2024).*

(Continued)

*Primary Examiner* — Malcolm Barnes
(74) *Attorney, Agent, or Firm* — Procopio, Cory, Hargreaves & Savitch LLP

(57) ABSTRACT

It is an object to provide a thin film inductor element using a new type of emergent electromagnetic field, which has a not so high difficulty in selecting materials, and also has a not so high temperature dependency.

A thin film inductor element is characterized by including: a stacked layer film including a magnetic body layer, and a non-magnetic body layer or an antiferromagnetic body layer stacked therein, and a pair of electrodes, and is characterized in that the magnetic body layer, and the non-magnetic body layer or the antiferromagnetic body layer are extended in an arbitrary shape in a (Continued)

direction orthogonal to a stacking direction, and a vertical orientation of the stacking direction is also arbitrary, the magnetic body layer has a substantially uniform magnetization structure, and the pair of electrodes are provided at both ends to which the stacked layer film is extended, and an alternating current or a high frequency current is applied.

8 Claims, 4 Drawing Sheets

(56) References Cited

U.S. PATENT DOCUMENTS

| | | | | |
|---|---|---|---|---|
| 2016/0163444 | A1* | 6/2016 | Choi | H01F 41/043 336/200 |
| 2017/0209062 | A1* | 7/2017 | Iwasaki | A61B 5/245 |
| 2019/0096563 | A1 | 3/2019 | Choi et al. | |
| 2021/0383955 | A1* | 12/2021 | Nagaosa | H01F 17/00 |

OTHER PUBLICATIONS

Tomoyuki Yokouchi, Fumitaka Kagawa, Max Hirschberger, Yoshichika Otani, Naoto Nagaosa & Yoshinori Tokura "Emergent electromagnetic induction in a helical-spin magnet", Nature, vol. 586, Oct. 8, 2020.

Patent Cooperation Treaty, International Search Report, Application No. PCT/JP2022/000296, dated Apr. 5, 2022, in 5 pages.

Patent Cooperation Treaty, Written Opinion of the International Searching Authority, Application No. PCT/JP2022/000296, dated Apr. 5, 2022, in 6 pages.

Office Action for corresponding Taiwanese patent application No. 111106822 issued on Mar. 12, 2025.

Office Action for corresponding Korean patent application No. 10-2023-7027254 issued on Apr. 16, 2025.

NOA on Registration for corresponding Korean patent application No. 10-2023-7027254 issued on Nov. 13, 2025.

Office Action of corresponding Chinese Patent Application No. 2022800148.17.7, issued on Aug. 22, 2026.

* cited by examiner

THIN FILM INDUCTOR ELEMENT AND THIN FILM VARIABLE INDUCTOR ELEMENT

TECHNICAL FIELD

The present invention relates to a thin film inductor element and a thin film variable inductor element.

BACKGROUND ART

As an element for keeping the circuit current constant using the induced electromotive force generated at a coil, an inductor element is known. While a transformer for performing voltage transformation is recalled as a first use, the inductor element is also used as a high frequency circuit such as a filter in compact electrical equipment or an electric circuit. The circuit element for use in various electric equipment including a portable communication terminal, or the like is required to be reduced in size and to be miniaturized. The inductor element is also naturally required to have the same specifications. On the other hand, the inductance of the intensity of the inductor element is required to have a certain degree of size in order to achieve desirable functional characteristics. However, the inductance is proportional to the square of the winding number of the coil and the coil cross sectional area. The inductance intensity and the miniaturization are in a trade-off relationship, and hence there is naturally its own limit on the reduction of the size of the inductor element.

Under such circumstances, expecting the contribution to the miniaturization of the inductor element necessary for size reduction of electric equipment or an electric circuit, the principle of the emergent inductor as an inductor element due to the emergent electromagnetic field based on the spintronics technology has been elucidated, and has been successfully demonstrated. The emergent inductor disclosed in NPL 1 does not have a trade-off relationship of the inductance intensity and the size reduction as shown in FIG. 9 of contrast description with the related-art induction coil. Rather inversely, the emergent inductor has a property that the element cross sectional area is inversely proportional to the inductance, and the inductance increases with a decrease in size. For this reason, the emergent inductor is expected to largely contribute to downsizing.

CITATION LIST

Non Patent Literature

[NPL 1] Tomoyuki Yokouchi, Fumitaka Kagawa, Max Hirschberger, Yoshichika Otani, Naoto Nagaosa & Yoshinori Tokura "Emergent electromagnetic induction in a helical-spin magnet", Nature, Vol. 586, 8 Oct. 2020

SUMMARY OF INVENTION

Technical Problem

However, the emergent inductor generates an inductance due to the emergent electromagnetic field, and hence a non-collinear magnetic structure such as a helimagnetic structure (see FIG. 9) or a lateral conical magnetic structure becomes essential. In NPL1, it is confirmed that use of $Gd_3Ru_4Al_{12}$ forms a non-collinear magnetic structure. However, $Gd_3Ru_4Al_{12}$ is hardly a general material. Accordingly, for the emergent inductor, a right material is selected for its implementation. Even when the problem of properly selecting the material is cleared, formation of a helimagnetic structure requires crystal orientation control. In addition, a previous research has proved that the temperature dependency of the element performance is high. This resulted in a situation in which a large number of problems still remain in terms of practical application.

In order to solve the problems, it is an object of the present invention to provide a new type of thin film inductor element using an emergent electromagnetic field, not so highly difficult in selecting the material, and not so highly temperature dependent.

Solution to Problem

The thin film inductor element of the present invention includes at least the following configuration.

The thin film inductor element is characterized by including: a stacked layer film including: a magnetic body layer, and a non-magnetic body layer or an antiferromagnetic body layer stacked therein; and a pair of electrodes, and is characterized in that the magnetic body layer, and the non-magnetic body layer or the antiferromagnetic body layer are extended in an arbitrary shape in a direction orthogonal to a stacking direction, and a vertical orientation of the stacking direction is also arbitrary, the magnetic body layer has a substantially uniform magnetization structure, and the pair of electrodes are provided at both ends to which the stacked layer film is extended, and an alternating current or a high frequency current is applied.

Further, the thin film variable inductor element of the present invention includes at least the following configuration.

The thin film variable inductor element is characterized by including: a stacked layer film including a magnetic body layer, and a non-magnetic body layer or an antiferromagnetic body layer stacked therein; a barrier layer; a pair of electrodes for applying an alternating current or a high frequency current, and a gate electrode layer, and is characterized in that the magnetic body layer; and the non-magnetic body layer or the antiferromagnetic body layer are extended in an arbitrary shape in a direction orthogonal to a stacking direction, and the vertical orientation of the stacking direction is also arbitrary, the magnetic body layer has a substantially uniform magnetization structure, the pair of electrodes are provided at both ends to which the stacked layer film is extended, an alternating current or a high frequency current is applied, the barrier layer is provided so as to be further stacked on a surface closer to the non-magnetic body layer or the antiferromagnetic body layer, the gate electrode layer is provided so as to be further stacked on the barrier layer, and the gate electrode layer is applied with a positive or negative bias, thereby implementing an inductance modulating operation.

Further, the thin film variable inductor element of the present invention includes at least the following configuration.

The thin film variable inductor element is characterized by including: a stacked layer film including: a magnetic body layer, and a non-magnetic body layer or an antiferromagnetic body layer stacked therein; a pair of electrodes for applying an alternating current or a high frequency current; and a thin film coil surrounding the stacked layer film, and is characterized in that the magnetic body layer, and the non-magnetic body layer or the antiferromagnetic body layer are extended in an arbitrary shape in a direction orthogonal to a stacking direction, and a vertical orientation of the stacking direction is also arbitrary, the magnetic body layer has a substantially uniform magnetization structure, and ON/OFF and/or an orientation of a current of the thin film coil is switched to control an external magnetic field, thereby implementing an inductance modulating operation.

As the common features in the inventions, the "stacked layer film" naturally includes a two-layer film including a magnetic body layer, and a non-magnetic body layer or an antiferromagnetic body layer, and additionally, includes the one obtained by adding an additional film such as an underlayer or a gap layer. Further, the "arbitrary shape" means any shape such as a square, a circle, an ellipse, or a rectangle, and it is intended that the inductance is expressed even when an arbitrary shape is selected. Further, the wording "a pair of electrodes are provided at both ends to which the stacked layer film is extended" is intended to indicate that the height position in the stacking direction at which the electrode is provided does not matter, and to include even the aspect in which the height positions of individual electrodes are not aligned. Further, the term "substantially uniform magnetization structure" means not a non-collinear magnetic structure such as a helimagnetic structure or a lateral conical magnetic structure which is the essential requirement for implementing an emergent inductance in NPL 1, but a magnetic structure in which adjacent magnetic moments are arranged collinearly, and also includes some nonuniformity due to the temperature and the imperfection of the material.

DESCRIPTION OF EMBODIMENTS

A thin film inductor element and a thin film variable inductor element in accordance with an embodiment of the present invention use the spintronics technology or the emergent electromagnetic field as with an emergent inductor of the related art. The emergent inductor has found its use as an inductor for the first time by using the combination of the STT (Spin-transfer torque) and the spinmotive force of the reversed process. Naturally, each element does not focus on the SOT (Spin-orbit torque). On the other hand, the embodiment of the present invention uses the combination of the SOT (Spin-orbit torque), and the reversed process thereof. Incidentally, the SOT (Spin-orbit torque) has already been studied and developed in the field of a magnetoresistance memory, or the like.

Below, the embodiments of the present invention will be described by reference to the accompanying drawings. It should be noted that the following drawings are conceptual drawings created for illustrative purposes and do not necessarily show the exact manner in which they are to be implemented.

Configuration of Thin Film Inductor Element

Figure 1:
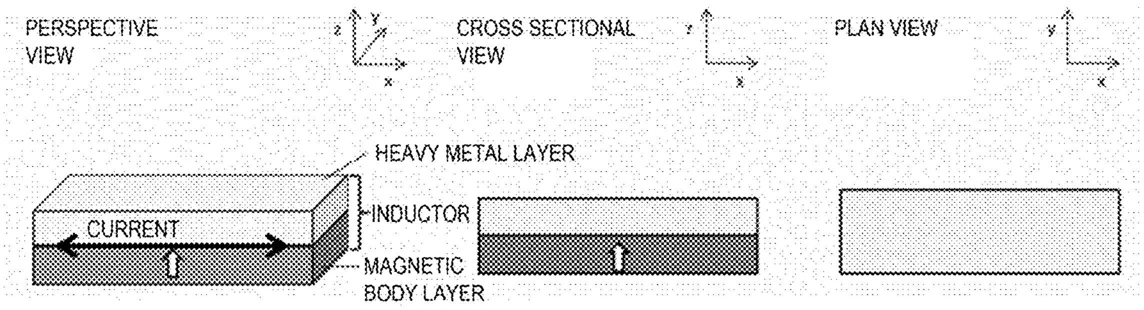
FIG. 1 shows a perspective view, a cross sectional view, and a plan view showing the structure concept of a thin film inductor element in accordance with an embodiment of the present invention.

FIG. 1 shows a perspective view, a cross sectional view, and a plan view showing the structure concept of the thin film inductor element in accordance with an embodiment of the present invention. The inductor is formed of a stacked layer film obtained by stacking a heavy metal on a magnetic body layer. The inductor element is extended in the x direction, is provided with electrodes not shown on both ends thereof, and is applied with an alternating current or a high frequency current. The z position at which the electrode is provided can be set to be an arbitrary position of a position closer to the heavy metal layer, a position closer to the magnetic body layer, or a position in the vicinity of the boundary of both. Further, the vertical relationship of the heavy metal layer and the magnetic body layer is also arbitrary, and the inductor element functions under the same conditions as an inductor even when the upper and lower positions may be interchanged with those shown. However, in consideration of common modularization with a thin film variable inductor element described later, or the like, it is advantageous to have the vertical relationship shown. The direction of magnetization of the magnetic body has a stable magnetic anisotropy in the direction in parallel with the stacking direction as indicated with an arrow outline with a blank inside of FIG. 1. However, the magnetic anisotropy is only an explanation of the embodiment. When a substantially uniform magnetization structure has been formed as already described, the inductance is expressed. Incidentally, actually, when the direction of magnetization points to the direction in parallel with the z direction or the direction in parallel with the x direction, a large inductance is obtained. Further, not limited to the heavy metal layer, a non-magnetic body layer capable of expressing the spin orbit torque expresses the inductance. Needless to say, the external magnetic field required for the magnetic inversion operation of the magnetoresistance memory is not required.

Manufacturing Method of Thin Film Inductor Element

For the deposition method of a thin film, an ultrahigh vacuum sputtering method, or the like is used. After depositing a thin film, a heat treatment may be performed in a magnetic field. For the thin film inductor element in accordance with the present embodiment, a 2-hour treatment was performed in a 300° C. atmosphere.

Principle of Inductor Operation

Figure 2:
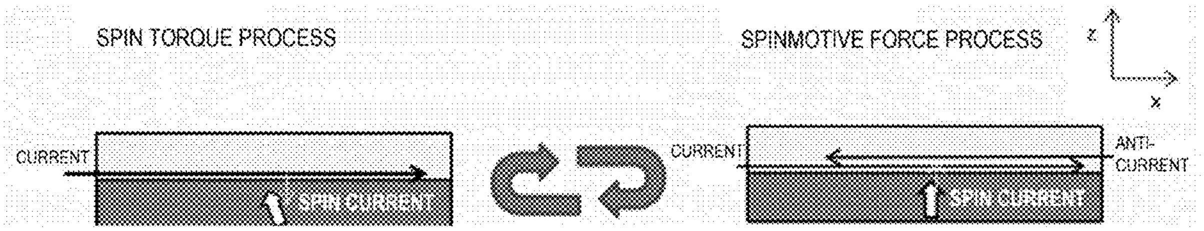
FIG. 2 is an explanatory view showing the inductance operation of the thin film inductor element in accordance with an embodiment of the present invention.

Herein, the principle of the inductor operation of the thin film inductor element in accordance with the present embodiment of the present invention will be described by reference to FIG. 2. The inductor operation is implemented by the alternate occurrence of the spin torque process and the spinmotive force process. It is easier to understand when this is regarded as the spintronics version of the Lenz's law regarding the electromagnetic induction that the direction in which a current flows when an induced current is caused by some reason is in agreement with the direction in which the cause of the induced current is hindered. Below, a specific description thereon will be given.

First, in the spin torque process, a current is introduced to the thin film inductor element in accordance with an embodiment of the present invention. At this step, spins in the paper plane depth direction (y direction) are accumulated at the interface between the magnetic body layer and the heavy metal layer, so that a spin orbit torque acts on magnetization of the magnetic body layer. As a result, the magnetization direction is inclined from the stable-energy substrate vertical direction (z direction). As the mechanism in which spins are accumulated, mention may be made of a "spin hole effect", "Rashba effect", or the like. Herein, the "spin hole effect" is the effect that the orbits of the electron spin-polarized in the +y direction and the electron spin-polarized in the −y direction at the heavy metal layer are bent in the opposite directions in the z direction, namely, the effect of causing a spin current in the −z direction. Therefore, into the magnetic body layer, only the electrons spin-polarized to one side in the y direction flow. Whereas, the "Rashba effect" is the effect that an effective electric field is generated at the interface between the heavy metal layer and the magnetic body layer, and only the conduction electrons spin-polarized in any direction of +y and −y are accumulated at the interface. FIG. 2 shows the spin current generated by the spin hole effect. The relationship between the electric current and the direction of the spin current is determined by the sign of the spin hole effect. FIG. 2 shows the case where the spin current flows in the −z direction when an electric current flows in the +x direction (conversely, the spin current flows in the +z direction when an electric current flows in the −x direction). The relationship of the directions varies according to the material of the heavy metal layer. Importantly, mention may be made of the change in sign of the spin current according to the sign of the electric current. This can change the spin polarization component of the electrodes to be accumulated, and can reverse the direction of the spin orbit torque acting on magnetization of the magnetic body layer. Accordingly, inputting of an alternating current results in the generation of the torque of an alternating-current torque. Further, when the current to be introduced to the inductor is alternating, magnetization of the magnetic body layer undergoes precession with the alternating frequency of the inputted current.

Then, in the spinmotive force process, using the magnetic energy accumulated by the magnetization inclined from the substrate vertical direction (z) stable in energy as the source, the precession of magnetization generates a spin current. Through the reverse processes of the spin hole effect, the Rashba effect, and the like, an anti-current is generated in the direction canceling the current introduced to the inductor. As a result, sum of the introduced current and the anti-current flows through the inductor, thereby implementing an action (inductor) of hindering the change in current.

Material, Dimension, and Shape Considered Preferable

As understood from the description up to this point, for the heavy metal layer (or more broadly and generally, non-magnetic body layer), it becomes an absolutely required condition to apply a spin orbit torque to the magnetic body layer. As the element, W, Ta, Pd, Pt, or Ir is known, and the element is preferably selected from these.

Alternatively, it is also possible to use not a heavy metal but an antiferromagnetic body. Specifically, the substance is an alloy including a first element selected from a group consisting of Cr, Mn, Fe, Co, and Ni, and a second element selected from another group consisting of Ru, Rh, Pd, Ag, Os, Ir, Pt, and Au. More specifically, a Pt—Mn alloy or an Ir—Mn alloy is used. For the composition, $Pt_XMn_{100-X}$, or $Ir_XMn_{100-X}$ where X=30-70 at. % is preferable. Further, the typical film thickness of the heavy metal layer or the antiferromagnetic body layer is 2 nm or more and 20 nm or less.

On the other hand, the magnetic body layer is formed of a ferromagnetic body, a ferrimagnetic body, and an antiferromagnetic body (note: the stacked layer film can also be formed of two layers of antiferromagnetic body layer/antiferromagnetic body layer), and is a material including Fe, Co, Ni, and Mn. In a case of an embodiment having the in-plane magnetization easy axis, specifically, a Ni—Fe alloy, a Co—Fe—B alloy, or the like can be used. In a case of an embodiment having a perpendicular magnetization easy axis, specifically, Co/Ni, Co/Pt, Co/Pd, Co/Au, Fe/Au stacked layer film, Co—Pt, Co—Cr—Pt, Co—Pd, Fe—Pt, Fe—Pd, Fe—Co—Pt, Fe—Co—Pd alloy, CoFeB, FeB alloy, or the like can be used, and a stack structure is also acceptable as [Co/Ni]/Ta/CoFeB. Further, the typical film thickness of the magnetic body layer for use in the magnetoresistance memory present in the related art is 0.8 nm or more and 5 nm or less. This is the thickness required for reversing the magnetization. For the thin film inductor element, it is sufficient to implement the inclination of the magnetization direction from the substrate vertical direction (z direction) stable in energy as described by reference to FIG. 2. For this reason, a wider setting range of the film thickness can be ensured. On the other hand, even when the film thickness is set too large, the thickness will be a waste thickness portion not contributing to the induction expression. After all, the film thickness may be set at an appropriate dimension according to the performance to be required.

In the case where the shape of each film of the two-layer film is assumed to be the same shape, even when an arbitrary shape such as a square, a circle, an ellipse, or a rectangle is selected as the planar shape of the stacked layer film, the inductance can be expressed. However, in consideration of the realistic handling, a rectangle would be advantageously selected.

Incidentally, in the drawings, the inductor element is shown as the one including two layers of the magnetic body layer and the heavy metal layer. Actually, a stacked layer film is also acceptable which is provided with an underlayer for forming the layers so as to obtain desirable characteristics in the manufacturing process, the cap layer for protecting the element in the process of micromachining, and the like.

Specific Materials and Dimensions, and Measurement Results of the Present Embodiments As an embodiment of the present invention, experiments were performed using the following four stack configurations, thereby determining the inductance when the element sizes were standardized to a length of 100 μm, a width of 100 nm, and a thickness of 10 nm.

A first one was a film configuration including Si sub./Ta (3)/CoFeB(1)/MgO(1.3)/Ta(1) from the substrate side. The magnitude of the spin orbit torque effective magnetic field per current density generated in this case was $1.1\times10^{-11}$ [mT/(A/m$^2$)], and the inductance in this case was 0.0065 [nH].

A second one was a film configuration including Si sub./W(3)/CoFeB (1.3)/MgO(1.3)/Ta(1) from the substrate side. The magnitude of the spin orbit torque effective magnetic field per current density generated in this case was $9.0\times10^{-11}$ [mT/(A/m$^2$)], and the inductance in this case was 1.0 [nH].

A third one was a film configuration including Si sub./Ta (2)/Pt(3)/Co(1.6)/MgO(2)/Ta(1) from the substrate side. The magnitude of the spin orbit torque effective magnetic field per current density generated in this case was $1.4\times10^{-11}$ [mT/(A/m$^2$)], and the inductance in this case was 0.04 [nH].

A fourth one was a film configuration including Si sub./Ta(4)/Pt(2)/PtMn(3)/[Co(0.3)/Ni(0.6)]2/ Co(0.3)/MgO(1.5)/Ru(1) from the substrate side. The magnitude of the spin orbit torque effective magnetic field per current density generated in this case was $4.2\times10^{-11}$ [mT/(A/m$^2$)], and the inductance in this case was 0.1 [nH].

Advantageous Effect Compared to the Related Art

The inductance when an inductor with the same sizes is manufactured with an air-core solenoid coil using the principle of the classical electromagnetics is estimated as follows.

It is assumed that the length of the inductor is 100 μm, the width thereof is 100 nm, and the thickness thereof is 10 nm, and the winding density of the solenoid coil is assumed to be 1 round per 100 nm as the feasible value with a current micromachining technology. The inductance L of the solenoid coil is given as $L=\mu_0 n^2 lWt$ where $\mu_0$ represents the magnetic permeability, n represents the winding density, l represents the length, W represents the width, and t represents the thickness, thereby to be determined as 0.013 nH. However, the inductor element based on the principle of the present invention can be implemented only by processing the stacked layer film in a thin line shape. Accordingly, the manufacturing cost can be remarkably suppressed as compared with a classical inductor. Namely, the thin film inductor element in accordance with an embodiment of the present invention can implement an inductance equal to, or largely higher than that of a related-art classical inductor at an overwhelmingly lower cost.

The thin film inductor element in accordance with an embodiment of the present invention is also advantageous to an emergent inductor using a combination of the STT (spin-transfer torque) and the spinmotive force of the reversed process thereof. As described previously, for the emergent inductor, it is essential to form a noncollinear magnetic structure such as a helimagnetic structure. The material showing the structure is special, and is not suitable for mass production. Further, the spiral axis directions are required to be aligned by crystal orientation control or the like. Further, the axis around which the magnetization of the helimagnetic structure rotates is determined by the crystal orientation. For these reasons, in order to allow the action as an inductor, a current is required to be passed in a specific axial direction of the crystal. The effect is reduced, or is not produced at all in other crystal axial directions than that. For clearing such various conditions, and obtaining a desirable inductance, a suitable cost is required.

In contrast, for the thin film inductor element in accordance with an embodiment of the present invention, in the first place, it is sufficient to use a standard magnetic body having a collinear magnetic structure. Furthermore, the easy axis of magnetization is determined to be perpendicular to the film surface due to the structure of the duplex film, and elements can be manufactured with simple deposition, and the inductance can be implemented at an overwhelmingly low cost.

The thin film inductor element in accordance with an embodiment of the present invention also has advantageous points in terms of the effect over the emergent inductor from another viewpoint. According to a previous study, with the emergent inductor, the inductance was expressed under very low temperature state of 16 K or less using a rather special material of $Gd_3Ru_4Al_{12}$. However, the inductance function was not expressed within the region of higher temperatures than that. It is needless to say that a material expressing an inductance function within a higher temperature region may be found in the future. However, the temperature region is limited to the temperature region in which a noncollinear magnetic structure including a helimagnetism on the magnetic state phase view is expressed. Accordingly, there still remains a restriction on the operating environment temperature. In either case, there is still a large hurdle to overcome for use in normal temperatures or higher temperature region.

In contrast, with the thin film inductor element in accordance with an embodiment of the present invention, there can be used general materials such as Ni—Fe alloy, Co—Fe—B alloy, Co/Ni, Co/Pt, Co/Pd, Co/Au, Fe/Au stacked layer film, Co—Pt, Co—Cr—Pt, Co—Pd, Fe—Pt, Fe—Pd, Fe—Co—Pt, Fe—Co—Pd alloy, CoFeB, and FeB alloy. These can sufficiently function at normal temperatures. Therefore, the thin film inductor element in accordance with an embodiment of the present invention has low obstacles to practical implementation thereof.

Configuration of Thin Film Variable Inductor Element

Figure 3:
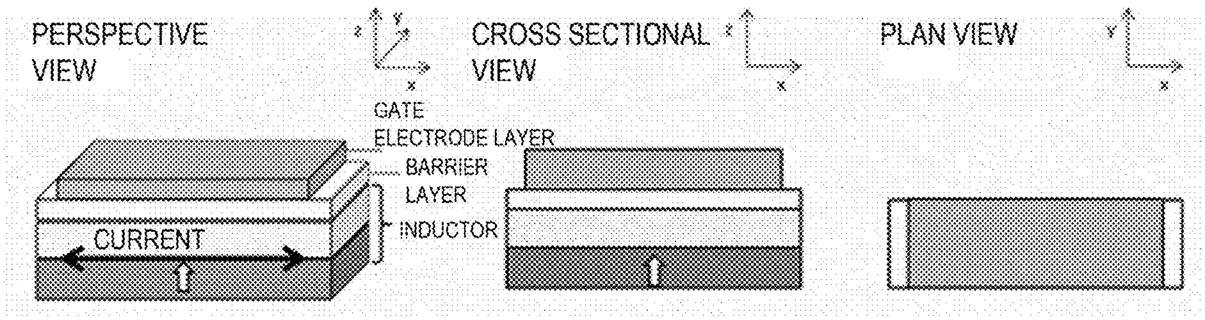
FIG. 3 shows a perspective view, a cross sectional view, and a plan view showing the structure concept of the thin film variable inductor element in accordance with an embodiment of the present invention.

For the inductor element according to the principle of the present invention, it has been also proved that the inductance can be controlled externally. This enables implementation of a thin film variable inductor element with the inductance set variable. FIG. 3 shows a perspective view, a cross sectional view, and a plan view showing the structure concept of a thin film variable inductor element in accordance with an embodiment of the present invention. The inductor is formed of a two-layer film obtained by stacking a heavy metal layer on a magnetic body layer, is extended in the x direction, is provided with electrodes not shown at both ends thereof, and is applied with an alternating current. These points are the same as those of the thin film inductor element shown in FIG. 1. The location to be provided with the electrode, and the shape of the two-layer film also have a high degree of freedom as with the thin film inductor element.

On the other hand, for the thin film variable inductor element, a barrier layer of an insulator is stacked adjacent to the surface of the heavy metal layer of the two-layer film. As the materials, mention may be made of MgO, $Al_2O_3$, AlN, and the like. It is important to express the perpendicular magnetic anisotropy by the interface magnetic anisotropy between the barrier layer and the recording layer. From this viewpoint, CoFeB/MgO and FeB/MgO are preferable. However, as described above, also in the case of the thin film variable inductor element, the direction of the magnetization easy axis has arbitrariness, and, for example, may be oriented in the x direction.

Then, on the barrier layer, a gate electrode layer of a metal is further stacked. The material is preferably a metal with good conductivity, for example, Ta, Ru, or Cu. The shape of the gate electrode layer is set so as to be contained in the inside of the barrier layer in the x-y plane. This is for preventing an electrical short-circuit between the gate electrode layer and the inductor. On the other hand, as the planar shape of the two-layer film, an arbitrary shape such as a square, a circle, an ellipse, or a rectangle can be selected, which is the same as with the thin film inductor element.

The direction of magnetization of the magnetic body has a stable magnetic anisotropy in the direction in parallel with the stacking direction as indicated with an arrow outline with a blank inside of FIG. 3. However, the magnetic anisotropy is for illustrating absolutely the embodiment, and the inductance is expressed so long as a substantially uniform magnetization structure is formed. Further, without being limited to the heavy metal layer, a non-magnetic body layer capable of expressing a spin orbit torque can express an inductance. It is needless to say that the external magnetic field required for the magnetization reversal operation of the magnetoresistance memory is not required.

Principle of Inductance Modulating Operation

Figure 4:
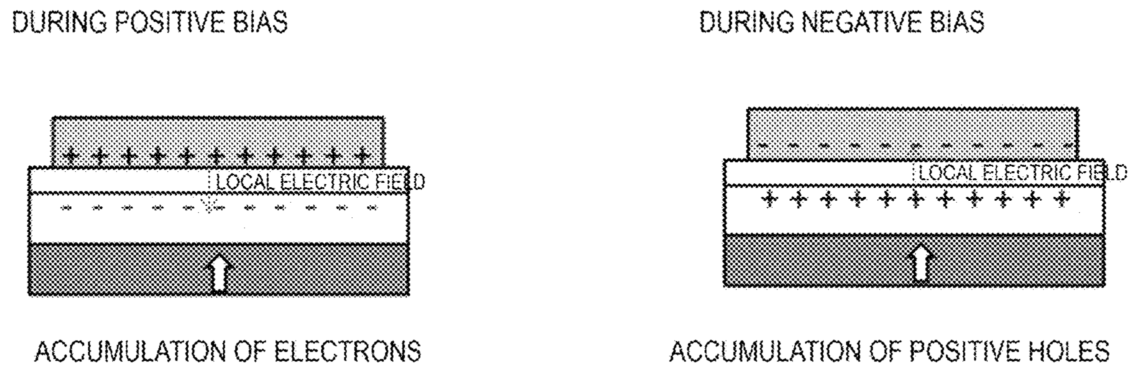
FIG. 4 is a view for illustrating the inductance modulating operation of the thin film variable inductor element in accordance with an embodiment of the present invention.

The principle of the inductance modulating operation of a thin film variable inductor element in accordance with an embodiment of the present invention will be described by reference to FIG. 4.

When the gate electrode layer is applied with a positive bias, electrons are accumulated at the junction surface interface with the insulation layer of the inductor, resulting in the occurrence of a local electric field as the channel region under the gate of a C-MOS. The electric field effect changes the spin orbit interaction acting on the inductor, so that various factors of the determining factors of the inductance are modulated. As the factors, mention may be made of the magnitude of the spin orbit torque, the magnitude of the spinmotive force of the reversed process thereof, and the magnitude of the magnetic anisotropy controlling the ease of change in the magnetization direction. As a result of the modulation action of the factors, the inductance generated at the two-layer film interface is modulated.

When the gate electrode layer is applied with a negative bias, positive holes are accumulated at the junction surface interface with the insulation layer of the inductor, resulting in the occurrence of a local electric field opposite to that described above. The change in spin orbit interaction due to the electric field effect has a component in proportion to the electric field and a component in proportion to the square of the electric field. For this reason, although the opposite modulation actions at the time of positive bias and at the time of negative bias cannot necessarily be expected at all times, the effects in proportion to the electric field are confirmed with a large number of heavy metals. Proper material selection enables the implementation of the bidirectional inductance modulating operation.

Advantageous Effect Over the Related Art

Among inductors using the principle of the classical electromagnetics, the one capable of inductance modulation is known. However, to that end, a mechanical component for operating the core for enhancing the magnetic permeability is required. In this respect, the thin film variable inductor element in accordance with an embodiment of the present invention performs an inductance operation in the presence of a bias, and thereby can implement a high-speed variable inductance due to electric control not involving a mechanical operation.

On the other hand, when attention is paid to the emergent inductor using the combination of the STT: Spin-transfer torque and the spinmotive force of the reversed process thereof, the change in inductance due to the temperature and the magnetic field is observed. However, the difficulties associated with the control such as the necessity of a large magnetic field of several teslas are remarkably high. In addition, the point of too large change in temperature is even a demerit for performing control. In this respect, the thin film variable inductor element in accordance with an embodiment of the present invention using a simple metal two-layer film is less changed in temperature, and can be controlled by the electric field orthogonal to the current path, resulting in a very high controllability.

Configuration of Thin Film Variable Inductor Element by Another Example

In the Example of FIG. 3, electric charges are collected under the gate electrode, resulting in the occurrence of a local electric field, which modulates various factors of the inductance, and additionally the inductance. By applying an external magnetic field, the ease of vibration (ease of movement) of the magnetic body is controlled, which can also modulate the inductance.

Figure 5:
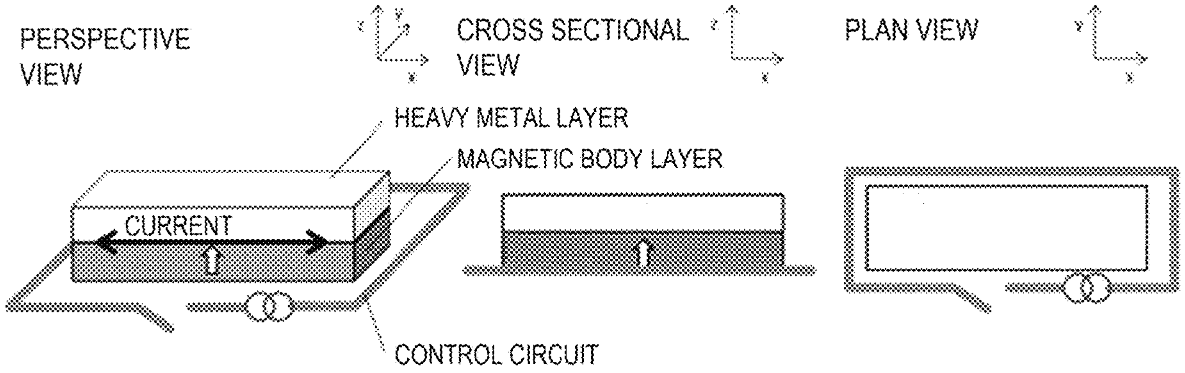
FIG. 5 shows a perspective view, a cross sectional view, and a plan view showing the structure concept of another example of the thin film variable inductor element in accordance with an embodiment of the present invention.

FIG. 5 shows a perspective view, a cross sectional view, and a plan view showing the structure concept of the thin film variable inductor element functioning by being applied with an external magnetic field. The inductor is formed of a two-layer film obtained by stacking a heavy metal layer on the magnetic body layer, is extended in the x direction, is provided with electrodes not shown at both ends thereof, and is applied with an alternating current. These points are the same as those of the thin film variable inductor element shown in FIG. 3. The location to be provided with the electrode, and the shape of the two-layer film also have a high degree of freedom as with the thin film variable inductor element shown in FIG. 3. Namely, as the planar shape of the two-layer film, an arbitrary shape such as a square, a circle, an ellipse, or a rectangle can be selected.

The direction of magnetization of the magnetic body has a stable magnetic anisotropy in the direction in parallel with the stacking direction as indicated with an arrow outline with a blank inside of FIG. 5. However, the magnetic anisotropy is for illustrating absolutely the embodiment, and the inductance is expressed so long as a substantially uniform magnetization structure is formed. Further, without being limited to the heavy metal layer, a non-magnetic body layer capable of expressing a spin orbit torque can express an inductance.

The difference from the thin film variable inductor element shown in FIG. 3 is that a thin film coil surrounding the stacked layer film is provided in place of the gate electrode. It is configured such that the Oersted magnetic field penetrating through the inductor element in the stacking direction can be controlled by switching ON-OFF of the current and the direction of the current by a circuit controlling the thin film coil.

Principle of Inductance Modulating Operation

Figure 6:
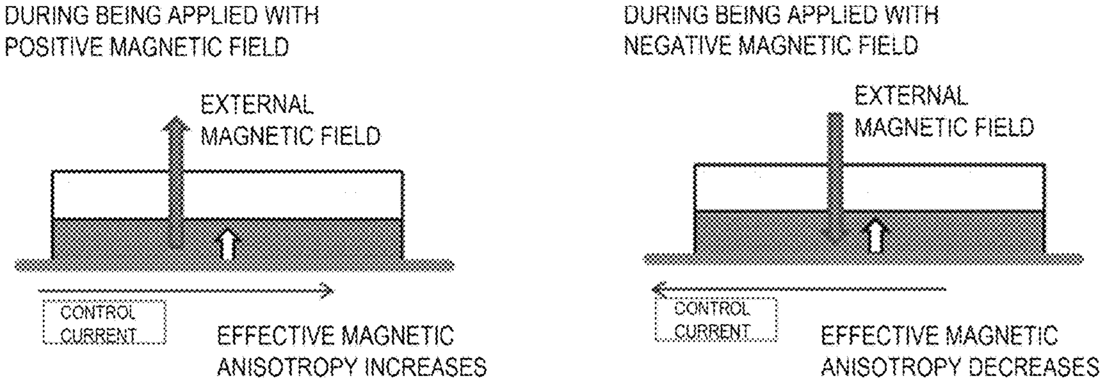
FIG. 6 is a view for illustrating the inductance modulating operation of a still other example of the thin film variable inductor element in accordance with an embodiment of the present invention.

The principle of the inductance modulating operation of the thin film variable inductor element functioning by being applied with an external magnetic field will be described by reference to FIG. 6.

When a positive magnetic field is applied in the +z direction in the control circuit, the effective magnetic anisotropy in the magnetic body of the inductor increases (the ease of vibration of the magnetic body decreases), and the inductance decreases. When a negative magnetic field is applied conversely, the effective magnetic anisotropy in the magnetic body of the inductor decreases (the ease of vibration of the magnetic body increases), and the inductance increases. Therefore, by performing the inductance operation while applying the external magnetic field generated by a control current, it is possible to implement a variable inductance due to electric control not involving the mechanical operation as in the related art. Incidentally, herein, the principle was described assuming the case where the direction of the magnetization easy axis of the magnetic body is in the z direction. However, when the direction of the magnetization easy axis of the magnetic body changes, the direction of the magnetic field to be applied can also vary accordingly.

Advantageous Effect Over the Related Art

Herein, the advantageous effect common to the thin film variable inductor element by a local electric field and the thin film variable inductor element by an external magnetic field is that the serviceable frequency band is wide. For the emergent inductor of the previous study using the spin transfer torque, NPL 1 has proved that the inductance rapidly decreases at a frequency of 30 kHz or more. The serviceable critical frequency is defined by local turbulence that interferes with the translational motion of the helical magnetism. Even with all the improvements, it is considered very difficult to enable use in, for example, the GHz band. In contrast, in the present invention, without using the translational movement of the space pattern of the magnetism like the helical magnetism, a uniform magnetic precession is used, resulting in no direct involvement of elemental disorder. As a result, the present invention can provide a given inductance in an ultrawide range from several hertz to several gigahertz. This point is important as high frequency use.

Operational Principles and Characteristics

The operational principles underlying the events described up to this point will be described. The operational principles can be described as the formula obtained from the derivation process described below.

The Rashba spin-orbit coupling (which will be referred to as a "RSOC") is known to be generated at the material system with the inversion symmetry broken, for example, the interface between a heavy metal and a different kind of material, and to provide a control means of an electron spin such as a spin orbit torque or a spinmotive force. Particularly, it is known that a conduction electron feels the following effective electric field (spin electric field) under RSOC at the interface between a magnetic body and a heavy metal.

$$\vec{E}_R^{\pm} = \pm\frac{m_e\eta_R}{e}\vec{e}_z\times\left(\frac{\partial\vec{m}}{\partial t}-\beta\vec{m}\times\frac{\partial\vec{m}}{\partial t}\right). \quad \text{[Math. 1]}$$

Herein, $m_e$ represents the electron mass, $\eta_R$ represents the parameter characterizing the size of the RSOC, e represents the elementary charge, m (vector) represents the unit vector indicative of the direction of uniform magnetization, $e_z$ (vector) represents the unit vector of the film thickness direction (z direction), and β represents the dimensionless parameter characterizing the nonadiabatic dynamics of the conduction electron spin. The superscript of the left-hand side of [Math. 1], and the signs over the entire right-hand side (by the double sign) conform to the distinction between electrons with majority spins and electrons with minority spins in the magnetic body, and indicates that the spin electric field varies in sign according to the spin direction of the electrons. Suppose now that the motion of magnetization is induced by an alternating current applied in the x direction. At this step, the spin electric field of [Math. 1] generates the voltage of [Math. 2] in the current direction.

$$\mathcal{E} = \int_0^l dxP(\vec{E}_R^{+})_x \quad \text{[Math. 2]}$$

l represents the length of the magnetic body-heavy metal composite film in the x direction, P represents the spin polarizability (degree of difference between majority spins and minority spins) of the conduction electron. The latter bears a role of averaging the spin electric field by majority spins and minority spins, and converting it to the actual electric field. The voltage generated by the spin electric field is known as a spinmotive force (which will be hereinafter referred to as "SMF"). As indicated in details below, the SMF gives the emergent inductance.

It is assumed that magnetization performs a small angle precession around the z direction. Namely, it is expressed as [Math. 3].

$$m_z\cong 1、m_{x,y}=\tilde{m}_{x,y}e^{i\omega t}(|\tilde{m}_{x,y}|<<1) \quad \text{[Math. 3]}$$

Herein, ω represents the angular frequency of the alternating current to be externally inputted. At this step, SMF is calculated as [Math. 4].

$$\mathcal{E} = \frac{Pm_e\eta_R}{e}l\ (-\tilde{m}_y+\beta\tilde{m}_x)i\omega e^{i\omega t} \quad \text{[Math. 4]}$$

Therefore, the inductance L caused by SMF can be determined by calculating [Math. 5] by the definition.

$$L\equiv\omega^{-1}\mathrm{IM}[-\mathcal{E}/I] \quad \text{[Math. 5]}$$

Herein, Im[ ] is a symbol taking the imaginary part of a complex number, and I(t)=Ajc(t) represents the total current flowing through a sample, where A represents the cross sectional area perpendicular to the x direction. Substitution of [Math. 4] of voltage results in [Math. 6].

$$L = -\frac{Pm_e\eta_R}{e}\frac{l}{Aj_c}-(\mathrm{Re}[\tilde{m}_y]+\beta\mathrm{Re}[\tilde{m}_x]) \quad \text{[Math. 6]}$$

Herein, Re[ ] is a symbol taking the real part of a complex number. Further, it is noted that a sign of L is defined so as to be a positive value when the SMF acts in the direction in which an anti-current is passed to an external current source.

The motion of magnetization can be obtained by solving the equation of motion of [Math. 7] (Landau-Lifshitz-Gilbert equation).

$$\frac{\partial \vec{m}}{\partial t} = -\gamma\vec{m}\times\left[(h_{dc}+h_K m_z)\vec{e}_z + h_{sf}e^{i\omega t}\vec{e}_y\right] + \alpha\vec{m}\times\frac{\partial \vec{m}}{\partial t} + \gamma h_{sd}e^{i\omega t}\vec{m}\times(\vec{m}\times\vec{e}_y), \quad \text{[Math. 7]}$$

where $\gamma$ represents the gyromagnetic ratio, $h_{dc}$ represents the external DC magnetic field applied in the z direction, $h_K$ represents the effective magnetic field caused by the perpendicular magnetic anisotropy, $\alpha$ represents the Gilbert relaxation coefficient, and $h_{sf}e^{i\omega t}$ and $h_{sd}e^{i\omega t}$ represent the intensity of the spin orbit torque magnetic field induced by a current. [Math. 7] can perform linearization approximation using the assumption regarding the motion of magnetization, and [Math. 8] provides the solution.

$$\begin{bmatrix}\tilde{m}_x\\ \tilde{m}_y\end{bmatrix} = \frac{1}{h_z^2-(1+\alpha^2)(\omega/\gamma)^2+2i\alpha h_z\omega/\gamma}\times\begin{bmatrix}h_z+i\alpha\omega/\gamma & i\omega/\gamma\\ -i\omega/\gamma & h_z+i\alpha\omega/\gamma\end{bmatrix}\begin{bmatrix}h_{sd}\\ h_{sf}\end{bmatrix}. \quad \text{[Math. 8]}$$

Herein, $h_z=h_{dc}+h_K$.

Substitution of [Math. 8] into [Math. 6] results in [Math. 9] of the formula of the emergent inductance L.

$$L = \left(\frac{Pm_e\eta_R}{2e\sqrt{K_{eff}}}\right)^2\frac{l}{A}, \quad \text{[Math. 9]}$$

Herein, $K_{eff}$ is the effective perpendicular magnetic anisotropy of the magnetic body, and $K_{eff}=K+\mu_0M_Sh_{dc}/2$, where K represents the perpendicular magnetic anisotropy constant, $\mu_0$ represents the magnetic permeability of the vacuum, and $M_S$ represents the saturation magnetization. This is the formula generally holding in the parameter region in which the spin orbit torque $h_{sd}$, and $h_{sf}$ are sufficiently smaller than $h_z$. Further, P represents the spin polarizability of the conduction electron in the magnetic body, $m_e$ represents the electron mass, $\eta_R$ represents the magnitude of the spin orbit interaction, e represents the elementary charge, l represents the length in the x direction of the terminal inductor layer, and A represents the cross sectional area of the inductor layer.

As the feature understood from [Math. 9], while the magnitude of the inductance is proportional to the element cross sectional area in the related art, the magnitude of the inductance of the present invention is inversely proportional to the element cross sectional area. For this reason, a compact element with a smaller cross sectional area can obtain a more intense inductance. The property is the same as that of the "emergent inductor using a combination of the spin transfer torque and a spinmotive force of the reversed process" proposed and demonstrated in NPL 1. In the present invention, the primary significance resides in the fact that the characteristic is implemented by a simple constituent element.

Figure 7:
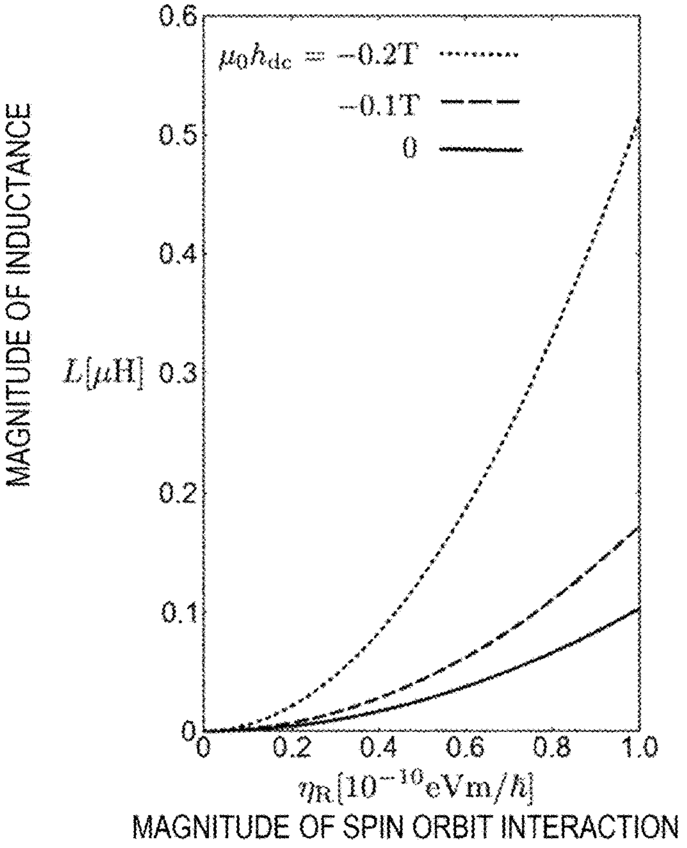
FIG. 7 is a view showing the inductance characteristic of the thin film variable inductor element in accordance with an embodiment of the present invention.

Further, the secondary significance resides in the fact that the variable inductance due to the electric field is implemented. The methods thereof include the two methods already described. The first method is that the magnitude $\eta_R$ of the spin orbit interaction of the parameters of the formula is modulated by an external electric field. For this reason, by applying the inductor layer with an electric field with the gate electrode, it is possible to change the magnitude of the inductance. FIG. 7 shows the state.

Figure 8:
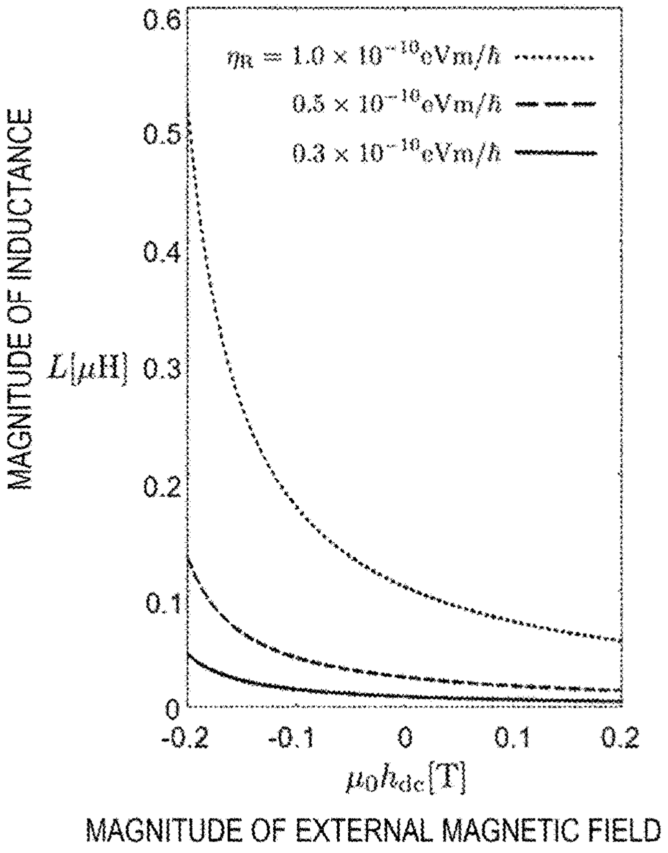
FIG. 8 is a view showing the inductance characteristic of another example of the thin film variable inductor element in accordance with an embodiment of the present invention.
Figure 9:
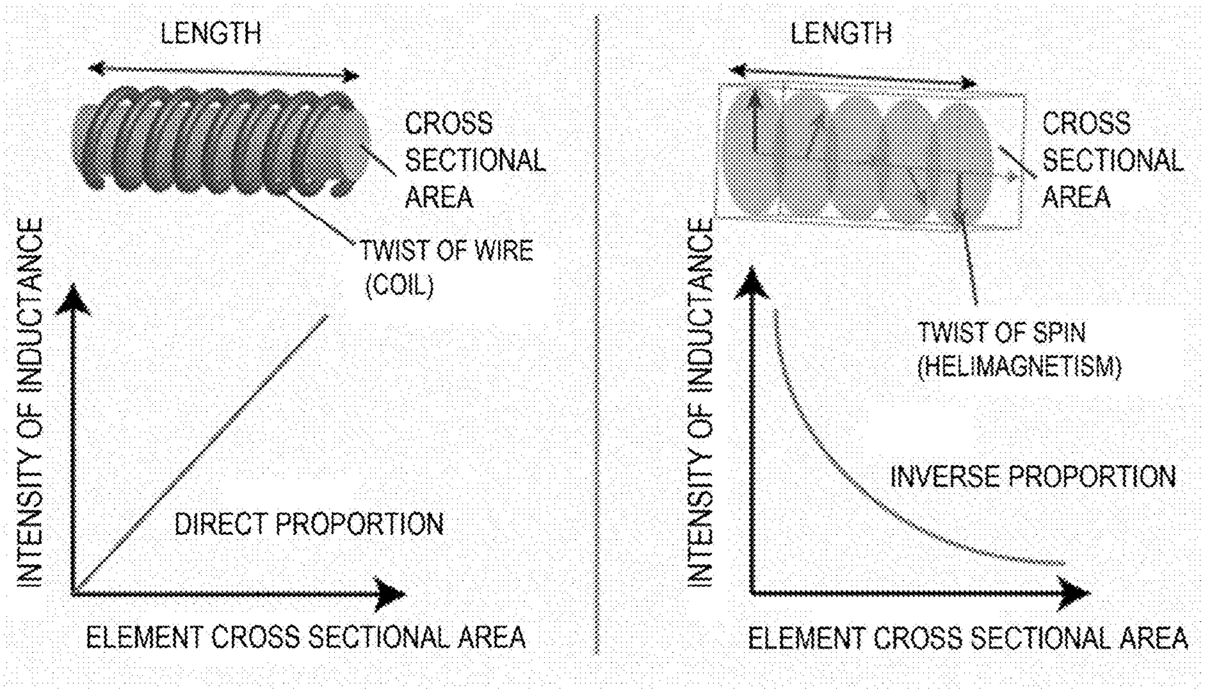
FIG. 9 is a view for illustrating a conventional induction coil and an emergent inductor by comparison.

The second method is the modulation of the inductance by the magnetic field. When an external magnetic field is applied in the film thickness direction of the element, the effective magnetic anisotropy of the formula changes. Through the action, the magnitude of the inductance can be changed by an external magnetic field. FIG. 8 shows the state.

The highest level of the technical idea as the structure grasped from the features described here is an element including a stacked layer film including two different conductors stacked therein and a pair of electrodes positioned at both ends in the direction crossing the stacking direction. This is because a stacked layer film including two layers of antiferromagnetic body layer/antiferromagnetic body layer is also included as described in the item of preferable material. The element including such a stacked layer film and a pair of electrodes as the minimum elements itself can be said to be a completely unprecedent element. In addition, the one obtained by adding a gate electrode or thin film coil to the element can also be widely contemplated as a technical idea as a novel structure.

Further, the highest level of the technical idea as the function grasped from the features described here is an element including a first layer of a layer for generating a spin orbit torque when applied with an alternating current, and a second layer of a layer for providing precession of the magnetic moment due to the spin orbit torque. Additionally, the element obtained by adding a region for generating a local electric field to the first layer of the element, and the element obtained by adding a coil for applying an external magnetic field to the element can also be widely contemplated as a technical idea as a new function.

Further, although a description as an embodiment has not been given, it is also possible to extend the technical idea by focusing attention on the length l of the right-hand side of [Math. 9]. Namely, when the length l in the longitudinal direction of the element is elongated, the inductance would increase proportionally thereto. It is also possible to increase the length l of the current path while keeping the element size small by winding or stacking the basic structure of the element of the present invention in such a form as, for example, a "film capacitor". When necessary measures such as specific aspects of wiring of the multilayer film, magnetic dynamics control, and particularly a treatment to interference via the leakage magnetic field between different magnetic layers due to stacking are taken, the film plane perpendicular magnetization of the basic structure can be interlayer coupled to cause precession at the same phase with that of an alternating current. Thus, an increase in inductance is possible in principle.

Up to this point, the thin film inductor element and the thin film variable inductor element in accordance with embodiments of the present invention have been described in details by reference to the accompanying drawings. However, the specific configuration is not limited to the Examples, and even changes in design within the scope not departing from the gist of the present invention, and the like are included in the present invention.

Particularly, it is not like that the materials, the film thickness dimensions, and the like prevent the function of the inductance from being expressed unless these are limited to the examples herein disclosed, but that these become usable so long as the spin orbit torque can be expressed (therefore, it is not like that the materials optimum for expression of the spin torque is essential).

The materials exemplified are general as materials for a magnetic body, has an effective magnetic anisotropy within the normal temperature range, and can be controlled in change. Therefore, it should be fully understood that the significance of the present invention resides in being able to provide an inductor element and a variable inductor element which can be used within a wide temperature range owing to the less temperature dependency due to the general materials and the simple structure.

The invention claimed is:

1. A thin film inductor element, comprising:

a stacked layer film including: a magnetic body layer and a non-magnetic body layer, or an antiferromagnetic body layer stacked therein; and a pair of electrodes, wherein the magnetic body layer, and the non-magnetic body layer or the antiferromagnetic body layer are extended in an arbitrary shape in a direction orthogonal to a stacking direction, and a vertical orientation of the stacking direction is also arbitrary, the magnetic body layer has a substantially uniform magnetization structure, and the pair of electrodes are provided at both ends to which the stacked layer film is extended, and an alternating current or a high frequency current is applied.

2. The thin film inductor element according to claim 1, wherein the non-magnetic body layer has a composition suitable for expression of a spin orbit torque.

3. The thin film inductor element according to claim 2, wherein the composition suitable for expression of the spin orbit torque includes a heavy metal selected from elements of W, Ta, Pd, Pt, and Ir.

4. The thin film inductor element according to claim 1, wherein the antiferromagnetic body layer has a composition suitable for expression of a spin orbit torque.

5. The thin film inductor element according to claim 4, wherein the composition suitable for expression of the spin orbit torque is an alloy including a first element selected from a group consisting of Cr, Mn, Fe, Co, and Ni, and a second element selected from another group consisting of Ru, Rh, Pd, Ag, Os, Ir, Pt, and Au.

6. A thin film variable inductor element comprising: a stacked layer film including a magnetic body layer, and a non-magnetic body layer or an antiferromagnetic body layer stacked therein; a barrier layer; a pair of electrodes for applying an alternating current or a high frequency current; and a gate electrode layer, wherein the magnetic body layer, and the non-magnetic body layer or the antiferromagnetic body layer are extended in an arbitrary shape in a direction orthogonal to a stacking direction, and the vertical orientation of the stacking direction is also arbitrary, the magnetic body layer has a substantially uniform magnetization structure, the pair of electrodes are provided at both ends to which the stacked layer film is extended, an alternating current or a high frequency current is applied, the barrier layer is provided so as to be further stacked on a surface closer to the non-magnetic body layer or the antiferromagnetic body layer, the gate electrode layer is provided so as to be further stacked on the barrier layer, and the gate electrode layer is applied with a positive or negative bias, thereby implementing an inductance modulating operation.

7. The thin film variable inductor element according to claim 6, wherein the gate electrode layer is set in a smaller shape than that of the barrier layer in a plane in parallel with the stacking direction.

8. A thin film variable inductor element, comprising: a stacked layer film including: a magnetic body layer, and a non-magnetic body layer or an antiferromagnetic body layer stacked therein; a pair of electrodes for applying an alternating current or a high frequency current; and a thin film coil surrounding the stacked layer film, wherein the magnetic body layer, and the non-magnetic body layer or the antiferromagnetic body layer are extended in an arbitrary shape in a direction orthogonal to a stacking direction, and a vertical orientation of the stacking direction is also arbitrary, the magnetic body layer has a substantially uniform magnetization structure, and ON/OFF and/or an orientation of a current of the thin film coil is switched to control an external magnetic field, thereby implementing an inductance modulating operation.

* * * * *